(12) United States Patent
Wang et al.

(10) Patent No.: US 11,580,781 B2
(45) Date of Patent: Feb. 14, 2023

(54) METHOD AND APPARATUS FOR WAKING UP DEVICE, ELECTRONIC DEVICE, AND STORAGE MEDIUM

(71) Applicant: Beijing Baidu Netcom Science and Technology Co Ltd, Beijing (CN)

(72) Inventors: Keyao Wang, Beijing (CN); Haocheng Feng, Beijing (CN); Haixiao Yue, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 167 days.

(21) Appl. No.: 17/118,176

(22) Filed: Dec. 10, 2020

(65) Prior Publication Data

US 2021/0406522 A1 Dec. 30, 2021

(30) Foreign Application Priority Data

Jun. 28, 2020 (CN) .......................... 202010600365.3

(51) Int. Cl.
*G06V 40/16* (2022.01)
*G06T 7/70* (2017.01)
(Continued)

(52) U.S. Cl.
CPC ............ *G06V 40/171* (2022.01); *G06F 3/165* (2013.01); *G06F 9/4418* (2013.01); *G06F 21/32* (2013.01);
(Continued)

(58) Field of Classification Search
CPC ........ G06F 3/165; G06F 3/167; G06F 9/4418; G06F 21/32; G06F 1/3209; G06K 9/628;
(Continued)

(56) References Cited

U.S. PATENT DOCUMENTS

2017/0279995 A1* 9/2017 Yamasaki ............. G06F 3/1238
2021/0382542 A1* 12/2021 Liu ....................... G06K 9/6232

FOREIGN PATENT DOCUMENTS

CN 106484113 A * 3/2017
CN 106878559 A * 6/2017
(Continued)

OTHER PUBLICATIONS

Naqvi, Rizwan Ali, et al. "Deep learning-based gaze detection system for automobile drivers using a NIR camera sensor." Sensors 18.2 (2018): 456. (Year: 2018).*

*Primary Examiner* — Edward F Urban
*Assistant Examiner* — Wassim Mahrouka
(74) *Attorney, Agent, or Firm* — Akerman LLP (57) ABSTRACT

A method and apparatus for waking up a device, an electronic device, and a storage medium are provided, which are related to fields of image processing and deep learning. The method includes: acquiring an environment image of a surrounding environment of a target device in real time, and recognizing a face region of a user in the environment image; acquiring a plurality of facial landmarks in the face region, and acquiring a left eye image and a right eye image according to the facial landmarks; acquiring a left eye sight classification result and a right eye sight classification result according to the left eye image and the right eye image; and waking up the target device in a case of determining that the user is looking at the target device according to the left eye sight classification result and the right eye sight classification result.

20 Claims, 4 Drawing Sheets (51) Int. Cl.
    *G06V 40/19*         (2022.01)
    *G06F 3/16*          (2006.01)
    *G06F 9/4401*       (2018.01)
    *G06F 21/32*        (2013.01)
    *G06K 9/62*          (2022.01)

(52) U.S. Cl.
    CPC ................ *G06K 9/628* (2013.01); *G06T 7/70*
              (2017.01); *G06V 40/165* (2022.01); *G06V*
              *40/166* (2022.01); *G06V 40/172* (2022.01);
              *G06V 40/19* (2022.01); *G06T 2207/30201*
                                          (2013.01)

(58) Field of Classification Search
    CPC ............ G06T 7/70; G06T 2207/30201; G06V
                     40/165; G06V 40/166; G06V 40/172;
            G06V 40/19; G06V 40/18; G06V 40/168;
            G06V 40/17; G06V 10/82; G06N 3/0454;
                                        G06N 3/08
    See application file for complete search history.

(56) References Cited

FOREIGN PATENT DOCUMENTS

| | | | | | |
|---|---|---|---|---|---|
| CN | 108509037 B | * | 4/2021 | ........... | G06F 1/3265 |
| CN | 113626778 A | * | 11/2021 | | |

* cited by examiner

FIG. 4

METHOD AND APPARATUS FOR WAKING UP DEVICE, ELECTRONIC DEVICE, AND STORAGE MEDIUM

CROSS-REFERENCE TO RELATED APPLICATION

This application claims priority to Chinese Patent Application No. 202010600365.3, filed on Jun. 28, 2020, which is hereby incorporated by reference in its entirety.

TECHNICAL FIELD

The present application relates to fields of image processing and deep learning, and in particular, to a method and apparatus for waking up a device, an electronic device, and a storage medium.

BACKGROUND

With the development of science and technology, intelligent devices, such as smart phones, tablet computers, and smart speakers, have been widely used in millions of households. Generally, an intelligent device, when not in use, will enter a sleep mode to reduce the energy consumption.

SUMMARY

A method and apparatus for waking up a device, an electronic device, and a storage medium are provided according to embodiments of the present application.

In a first aspect, a method for waking up a device is provided according to an embodiment of the present application, the method including:

acquiring an environment image of a surrounding environment of a target device in real time, and recognizing a face region of a user in the environment image;

acquiring a plurality of facial landmarks in the face region, and acquiring a left eye image and a right eye image according to the facial landmarks;

acquiring a left eye sight classification result and a right eye sight classification result according to the left eye image and the right eye image; and waking up the target device in a case of determining that the user is looking at the target device according to the left eye sight classification result and the right eye sight classification result.

In a second aspect, an apparatus for waking up a device is provided according to an embodiment of the present application, the apparatus including:

a face region recognition module configured for acquiring an environment image of a surrounding environment of a target device in real time, and recognizing a face region of a user in the environment image;

an eye image acquisition module configured for acquiring a plurality of facial landmarks in the face region, and acquiring a left eye image and a right eye image according to the facial landmarks;

a sight classification result acquisition module configured for acquiring a left eye sight classification result and a right eye sight classification result according to the left eye image and the right eye image; and a device wake-up module configured for waking up the target device in a case of determining that the user is looking at the target device according to the left eye sight classification result and the right eye sight classification result.

In a third aspect, an electronic device is provided according to an embodiment of the present application, which includes at least one processor and a memory communicatively connected with the at least one processor. The memory stores instructions executable by the at least one processor, and the instructions, when executed by the at least one processor, enable the at least one processor to perform the method according to any one of the embodiments of the present application.

In a fourth aspect, a non-transitory computer-readable storage medium storing computer instructions is provided according to an embodiment of the present application, wherein the computer instructions cause a computer to perform the method according to any one of the embodiments of the present application.

It should be understood that the above summary is not intended to identify key or critical features of embodiments of the present application, and should not be construed as limiting the scope of the application. Further features of the present application may be readily understood from the following detailed application.

BRIEF DESCRIPTION OF THE DRAWINGS

The drawings are used to better understand the solution and do not constitute a limitation to the present application, wherein.

DETAILED DESCRIPTION

The exemplary embodiments of the application will be described below in combination with drawings, including various details of the embodiments of the application to facilitate understanding, which should be considered as exemplary only. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

Figure 1:
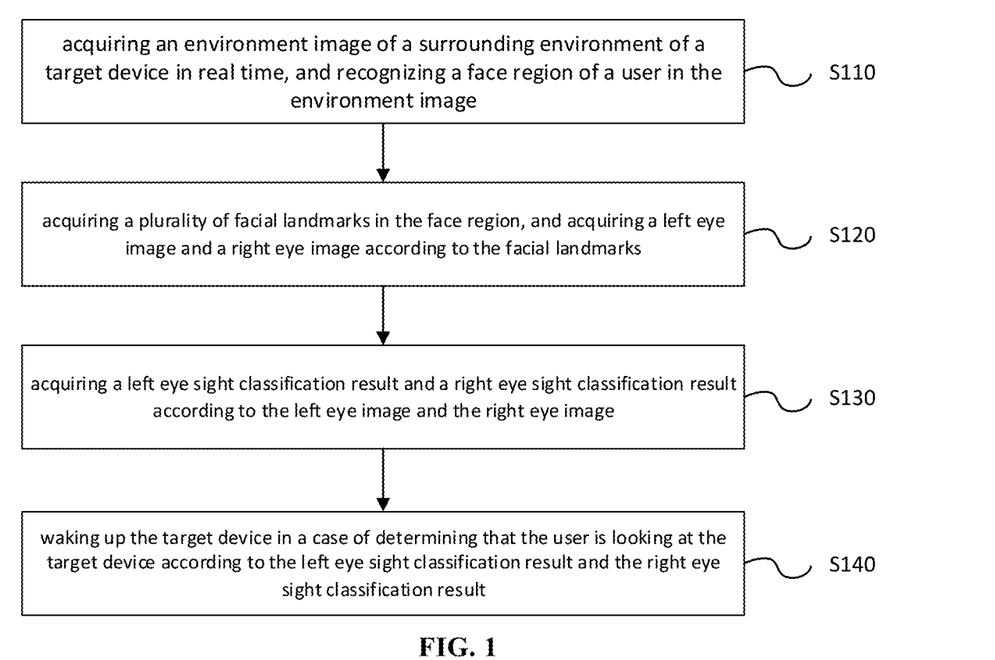
FIG. 1 shows a flowchart of a method for waking up a device according to an embodiment of the present application.

FIG. 1 shows a flowchart of a method for waking up a device according to an embodiment of the present application, and the technical solution of the embodiment of the present application is suitable for the case of waking up a device when a user is looking at the device. The method may be implemented by an apparatus for waking up a device, which may be implemented in software and/or hardware, and is typically integrated in an electronic device and used in conjunction with a photographic device.

As shown in FIG. 1, the technical solution of the embodiment of the present application specifically includes S110-S140.

At S110, an environment image of a surrounding environment of a target device is acquired in real time, and a face region of a user in the environment image is recognized.

The target device is a device to be woken up which will enter a sleep mode to reduce the energy consumption when detecting that the user has not used it for a long time, and will need to be woken up when the user is to use it again. Illustratively, the target device may be an intelligent speaker, a smart phone, a mobile tablet, etc.

The environment image is an image of the surrounding environment of the target device, and when the user needs to use the target device again, the environment image contains a portrait of the user.

The face region is a region which is recognized in the environment image and only contains the portrait of the user, and the purpose of recognizing the face region in the environment image is to recognize the sight of the user only in the face region, thereby improving the accuracy of recognizing the sight of the user. The face region can be recognized in the environment image by using a preset image recognition algorithm or by inputting the environment image into a face region detection model, and no limitation is made to the specific method for recognizing the face region in the environment image in this embodiment.

In this embodiment of the present application, the environment image of the surrounding environment of the target device is acquired in real time, and when it is detected that the environment image contains a portrait, the face region is recognized in the environment image.

In an alternative embodiment of the present application, the target device may be an intelligent speaker; and acquiring the environment image of the surrounding environment of the target device in real time, may include: acquiring the environment image of the surrounding environment of the target device in real time via at least one camera provided on the intelligent speaker.

In this embodiment of the present application, when the target device is an intelligent speaker, the environment image of the surrounding environment of the intelligent speaker may be acquired in real time via a front camera or a rear camera provided on the intelligent speaker. The intelligent speaker may be provided with a screen or without a screen. When the intelligent speaker is provided with a screen, to wake up the intelligent speaker may be to wake up the screen of the intelligent speaker; and when the intelligent speaker is not provided with a screen, to wake up the intelligent speaker may be to switch the intelligent speaker from a standby mode to an operation mode.

In an alternative embodiment of the present application, recognizing the face region of the user in the environment image, may include: inputting the environment image into a face bounding box detection model, to obtain coordinates of a plurality of face bounding boxes to be output by the face bounding box detection model; and determining a face region in the environment image according to the coordinates of the face bounding boxes.

In this embodiment of the present application, a face region is recognized in the environment image using the face bounding box detection model, and the face bounding box detection model outputs coordinates of a plurality of face bounding boxes corresponding to the environment image, so that the scope of the face region can be determined according to the coordinates of the face bounding boxes.

Alternatively, the face bounding box detection model may be a convolution neural network obtained through training according to a deep learning method, and the output result is four coordinates corresponding to a face bounding box, however no limitation is made to the specific form, the training process and the output result of the face bounding box detection model in this embodiment.

At S120, a plurality of facial landmarks are acquired in the face region, and a left eye image and a right eye image are acquired according to the facial landmarks.

The landmarks are points which are recognized in the face region and are related to facial features, and exemplary landmarks may be canthus points, upper eyelid points, lower eyelid points, nose tip points, eyebrow inner points, eyebrow outer points, upper lip points, lower lip points, etc. This embodiment does not limit the specific form of the landmarks and the specific way to obtain the landmarks.

The left eye image is an image which is recognized in the face region and contains only a region of the left eye of the user, and the right eye image is an image which is recognized in the face region and contains only a region of the right eye of the user. The purpose of acquiring the left eye image and the right eye image is to make the detected sight classification results of the user more accurate, thereby improving the accuracy of waking up the device.

In this embodiment of the application, after the plurality of facial landmarks are recognized in the face region, a left eye image is acquired according to the landmarks related to the left eye, and a right eye image is acquired according to the landmarks related to the right eye.

In an alternative embodiment of the present application, acquiring a plurality of facial landmarks in the face region, may include: inputting the environment image annotated with the face region into a facial landmark detection model, to obtain the plurality of facial landmarks to be output by the facial landmark detection model.

The facial landmark detection model is used for recognizing landmarks related to facial features in the face region of the inputted environment image.

In this embodiment of the present application, the facial landmarks are obtained by inputting the environment image annotated with the face region into the facial landmark detection model. The output of the facial landmark detection model is the coordinates of a plurality of facial landmarks corresponding to the face region in the environment image.

Alternatively, after the left eye image and the right eye image are acquired, the left eye image and the right eye image may be subjected to image normalization in which pixels in the left eye image and the right eye image may be normalized sequentially such that the pixel values of the pixels are within the range of [−0.5, 0.5]. The purpose of subjecting the left eye image and the right eye image to image normalization is to make the left eye sight classification result and the right eye sight classification result obtained according to the left eye image and the right eye image more accurate.

At S130, a left eye sight classification result and a right eye sight classification result are acquired according to the left eye image and the right eye image.

The left eye sight classification result is the classification result of the sight of the left eye of the user obtained according to the left eye image, and the right eye sight classification result is the classification result of the sight of the right eye of the user obtained according to the right eye image. In this embodiment of the present application, the sights of the eyes are classified instead of the angle of sight being directly recognized, thereby improving the accuracy of sight recognition, and preventing a large error due to the reason that the angle of sight is directly recognized.

In this embodiment of the present application, the left eye sight classification result and the right eye sight classification result may each include: looking up, looking down, looking left, looking right, looking forward, and closing an eye.

In this embodiment of the present application, the general direction of the sights of the eyes is determined in a coarse-grained manner, and accordingly a closest sight classification result can be determined.

A S140, the target device is woken up if it is determined that the user is looking at the target device according to the left eye sight classification result and the right eye sight classification result.

In this embodiment of the present application, after the left eye sight classification result and the right eye sight classification result are determined, whether the user is looking at the target device or not can be judged. If the user is looking at the target device, it indicates that the user intends to use the target device, so that the target device is to be woken up, and if the user is not looking at the target device, it indicates that the use does not intend to use the target device even if the portrait of the user appears in the environment image. Whether to wake up the target device or not is determined by judging whether the user is looking at the target device, so that the target device can be woken up quickly and conveniently when the user wants to use the target device again, while the problem of mis-unlocking when the user does not want to use the target device can be prevented.

According to the technical solution of the embodiment of the present application, the environment image of the surrounding environment of the device is acquired in real time; the left eye image and the right eye image are acquired when a face is recognized in the environment image; the left eye sight classification result and the right eye sight classification result are acquired; and the device is woken up when it is recognized that the user is looking at the device. The problems in the existing technology that methods for waking up a device by a manual operation are cumbersome, and methods for waking up a device by portrait identification or iris identification are prone to mis-unlocking are solved, so that the effect of conveniently and accurately waking up a device is achieved.

Figure 2A:
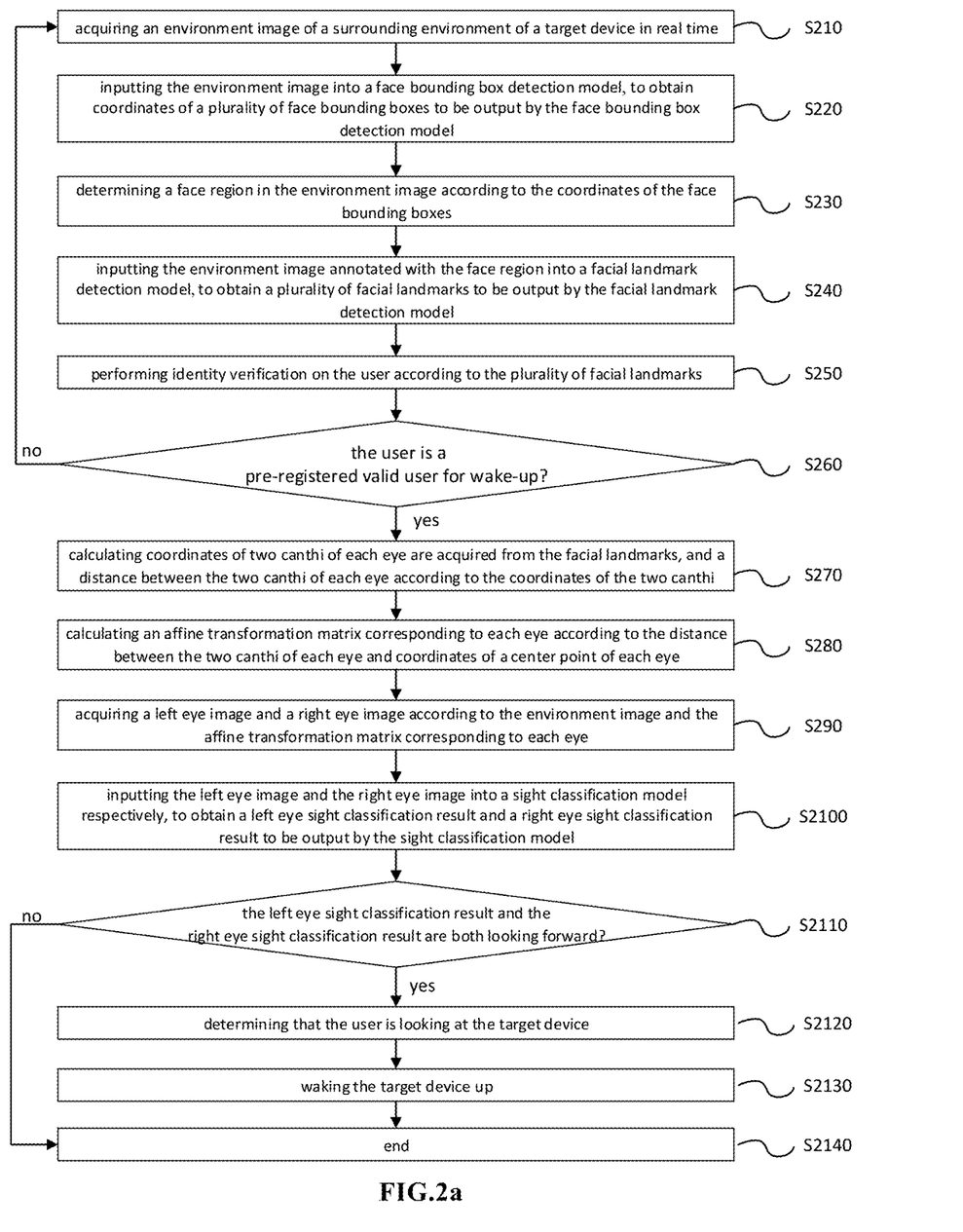
FIG. 2a shows a flowchart of a method for waking up a device according to an embodiment of the present application.

FIG. 2a shows a flowchart of a method for waking up a device according to an embodiment of the present application. In this embodiment of the present application, a process of recognizing a face region, a process of acquiring a left eye image and a right eye image, a process of acquiring a left eye sight classification result and a right eye sight classification result, and a process of determining that the user is looking at the device are further specialized on the basis of the afore-mentioned embodiments.

Accordingly, as shown in FIG. 2a, the technical solution of this embodiment of the present application specifically includes S210-S2140.

At S210, an environment image of a surrounding environment of a target device is acquired in real time.

In this embodiment of the present application, the environment image of the surrounding environment of the target device may be acquired in real time via a camera provided on the target device.

At S220, the environment image is input into a face bounding box detection model, to obtain coordinates of a plurality of face bounding boxes to be output by the face bounding box detection model.

In this embodiment of the present application, when the environment image contains a portrait, coordinates of a face bounding box will be output by the face bounding box detection model.

At S230, a face region is determined in the environment image according to the coordinates of the face bounding boxes.

At S240, the environment image annotated with the face region is input into a facial landmark detection model, to obtain a plurality of facial landmarks to be output by the facial landmark detection model.

In this embodiment of the present application, facial landmarks in the face region in the environment image are recognized by the facial landmark detection model.

At S250, identity verification is performed on the user according to the plurality of facial landmarks.

Furthermore, in this embodiment of the present application, identity verification is performed on the user according to the facial landmarks, so as to determine whether the detected face region in the environment image matches a valid user for wake-up who has been registered at the target device in advance or not.

The advantage of identity verification is that the target device is prevented from being woken up by unregistered users, thereby improving the security of the use of the target device.

At S260, whether the user is a pre-registered valid user for wake-up or not is determined, and if so, go to S270, or else go to S210.

The valid user for wake-up is a user who has been registered at the target device in advance and whose facial landmark-related information has been stored in the target device in advance. The target device is to be woken up only if the user is a valid user for wake-up and is looking at the target device.

At S270, coordinates of two canthi of each eye are acquired from the facial landmarks, and a distance between the two canthi of each eye is calculated according to the coordinates of the two canthi.

In this embodiment of the present application, the coordinates of the two canthi of the left eye and the coordinates of the two canthi of the right eye are selected from the facial landmarks. According to the coordinates of the two canthi of each eye, a distance between two canthi and coordinates of a center point of each of the left eye and the right eye can be calculated.

At S280, an affine transformation matrix corresponding to each eye is calculated according to the distance between the two canthi of each eye and coordinates of a center point of each eye.

An affine transformation is a process of performing a linear transformation on an original image and then performing a translation transformation. In this embodiment of the present application, according to an affine transformation matrix corresponding to the left eye and an affine transformation matrix corresponding to the right eye, the environment image is subjected to the affine transformation to obtain a left eye image and a right eye image. The affine transformation matrix is used to represent a transformation relationship between the environment image and the left eye image or the right eye image.

At S290, a left eye image and a right eye image are acquired according to the environment image and the affine transformation matrix corresponding to each eye.

In this embodiment of the present application, the environment image is subjected to the affine transformation according to the affine transformation matrix corresponding to the left eye, thereby obtaining the left eye image. The environment image is subjected to the affine transformation according to the affine transformation matrix corresponding to the right eye, thereby obtaining the right eye image.

At S2100, the left eye image and the right eye image are input into a sight classification model respectively, to obtain a left eye sight classification result and a right eye sight classification result to be output by the sight classification model.

The left eye sight classification result and the right eye sight classification result each include: looking up, looking down, looking left, looking right, looking forward, and closing an eye.

Figure 2B:
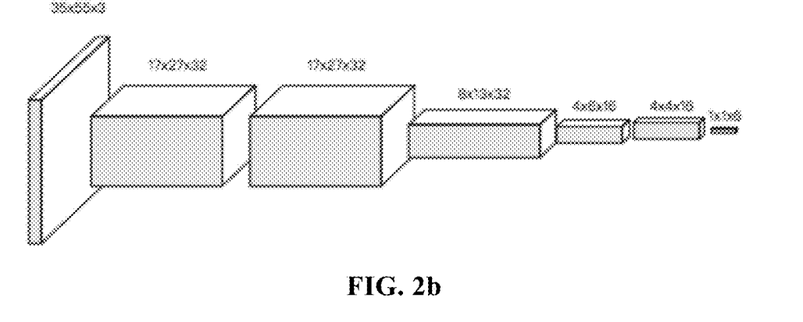
FIG. 2b shows a structural schematic diagram of a sight classification model applicable in an embodiment of the present application.

FIG. 2b shows a structural schematic diagram of a sight classification model. As shown in FIG. 2b, the sight classification model is a convolution neural network containing five convolution layers and three pooling layers, and the numbers in FIG. 2b are the sizes of the left eye image or the right eye image as it passes through the network.

At S2110, whether the left eye sight classification result and the right eye sight classification result are both looking forward or not is judged, and if so, go to S2120, or else go to S2140.

When the left eye sight classification result and the right eye sight classification result are both looking forward, it is determined that the user is looking at the target device, or else the user is not looking at the target device. Only when it is determined that the user is looking at the target device, the target device is woken up, so that mis-unlocking when the user appears in the vicinity of the intelligent device but he/she does not want to wake up the device is prevented.

At S2120, it is determined that the user is looking at the target device.

At S2130, the target device is woken up.

At S2140, it is over.

According to the technical solution of this embodiment of the present application, the environment image of the surrounding environment of the device is acquired in real time; the left eye image and the right eye image are acquired when a face is recognized in the environment image; the left eye sight classification result and the right eye sight classification result are acquired; and the device is woken up when the left eye sight classification result and the right eye sight classification result are both looking forward. The problems in the existing technology that methods for waking up a device by a manual operation are cumbersome, while methods for waking up a device by portrait identification or iris identification are prone to mis-unlocking are solved, so that the effect of conveniently and accurately waking up a device is achieved by waking up the device when it is detected that the user is looking at the device.

Specific Application Scenario

Figure 2C:
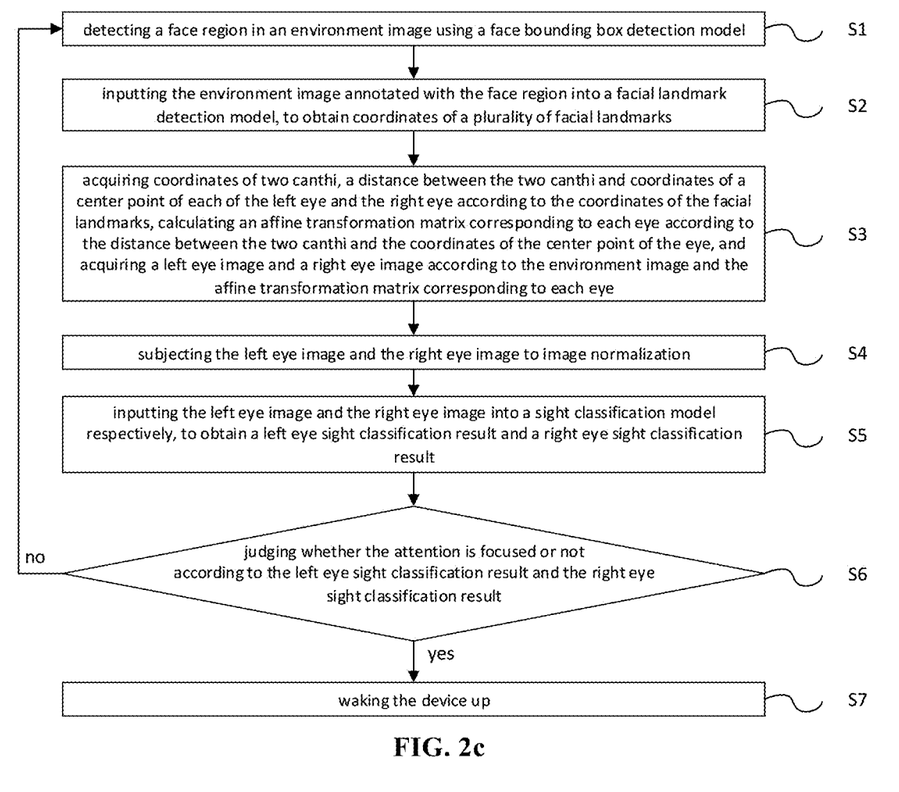
FIG. 2c shows a flowchart of a method for waking up a device applicable to a specific application scenario of the present application.

FIG. 2c shows s a flowchart of a method for waking up a device applicable to a specific application scenario of the present application. As shown in FIG. 2c, the method includes S1-S7.

At S1, a face region is detected in an environment image using a face bounding box detection model.

The face bounding box detection model performs a face bounding box detection on the environment image using a deep learning method, and extracts basic facial features through a six-layer convolution network. The image is down-sampled in each layer of the convolution network; based on the last three layers of the convolution network, points of a fixed number of face bounding boxes with different sizes are preset respectively, for a face bounding box regression, and finally coordinates of a plurality of face bounding boxes are obtained, and the face region is determined according to the face bounding boxes.

At S2, the environment image annotated with the face region is input into a facial landmark detection model, to obtain coordinates of a plurality of facial landmarks.

At S3, coordinates of two canthi, a distance between the two canthi and coordinates of a center point of each of the left eye and the right eye are acquired according to the coordinates of the facial landmarks, an affine transformation matrix corresponding to each eye is calculated according to the distance between the two canthi and the coordinates of the center point of the eye, and a left eye image and a right eye image are acquired according to the environment image and the affine transformation matrix corresponding to each eye.

At S4, the left eye image and the right eye image are subjected to image normalization.

At S5, the left eye image and the right eye image are input into a sight classification model respectively, to obtain a left eye sight classification result and a right eye sight classification result.

The sight classification model extracts features from the left eye image and the right eye image, which have been subjected to image normalization, through a convolution neural network containing five convolution layers and three pooling layers, and outputs a sight classification result through a fully connected layer, respectively.

The sight classification result may be looking up, looking down, looking left, looking right, looking forward, and closing an eye.

At S6, whether the attention is focused or not is judged according to the left eye sight classification result and the right eye sight classification result, and if so, go to S7, or else, go to S1.

When the left eye sight classification result and the right eye sight classification result are both looking forward, it is determined that the attention is focused, or else the attention is not focused.

At S7, the device is woken up.

According to the technical solution of the embodiment of the present application, the environment image of the surrounding environment of the device is acquired in real time; the left eye image and the right eye image are acquired when a face is recognized in the environment image; the left eye sight classification result and the right eye sight classification result are acquired; and the device is woken up when it is recognized that the user is looking at the device. The problems in the existing technology that methods for waking up a device by a manual operation are cumbersome, while methods for waking up a device by portrait identification or iris identification are prone to mis-unlocking are solved, so that the effect of conveniently and accurately waking up a device is achieved.

Figure 3:
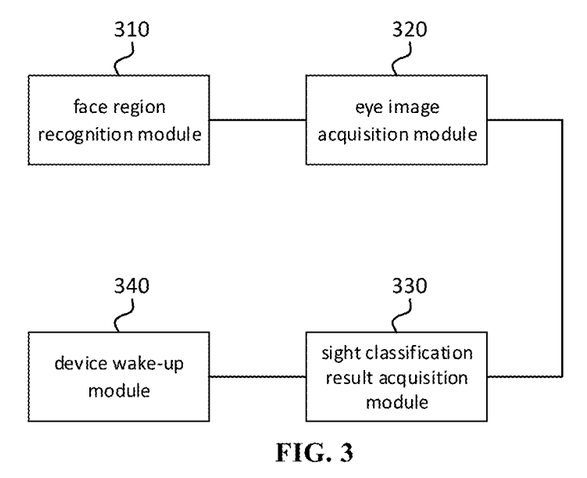
FIG. 3 shows a structural schematic diagram of an apparatus for waking up a device according to an embodiment of the present application.

FIG. 3 shows s a structural schematic diagram of an apparatus for waking up a device according to an embodiment of the present application. The apparatus may be implemented in software and/or hardware, and is typically integrated in an electronic device and used in conjunction with a photographic device. The apparatus includes: a face region recognition module 310, an eye image acquisition module 320, a sight classification result acquisition module 330, and a device wake-up module 340, wherein:

the face region recognition module 310 is configured for acquiring an environment image of a surrounding environment of a target device in real time, and recognizing a face region of a user in the environment image;

the eye image acquisition module 320 is configured for acquiring a plurality of facial landmarks in the face region, and acquiring a left eye image and a right eye image according to the facial landmarks;

the sight classification result acquisition module 330 is configured for acquiring a left eye sight classification result and a right eye sight classification result according to the left eye image and the right eye image; and the device wake-up module 340 is configured for waking up the target device in a case of determining that the user is looking at the target device according to the left eye sight classification result and the right eye sight classification result.

According to the technical solution of the embodiment of the present application, the environment image of the surrounding environment of the device is acquired in real time; the left eye image and the right eye image are acquired when a face is recognized in the environment image; the left eye sight classification result and the right eye sight classification result are acquired; and the device is woken up when it is recognized that the user is looking at the device. The problems in the existing technology that methods for waking up a device by a manual operation are cumbersome, while methods for waking up a device by portrait identification or iris identification are prone to mis-unlocking are solved, so that the effect of conveniently and accurately waking up a device is achieved.

On the basis of the above embodiment, the face region recognition module 310 includes:

a face bounding box coordinate acquisition unit configured for inputting the environment image into a face bounding box detection model, to obtain coordinates of a plurality of face bounding boxes to be output by the face bounding box detection model; and a face region acquisition unit configured for determining a face region in the environment image according to the coordinates of the face bounding boxes.

The eye image acquisition module 320 includes:

a facial landmark acquisition unit configured for inputting the environment image annotated with the face region into a facial landmark detection model, to obtain a plurality of facial landmarks to be output by the facial landmark detection model.

On the basis of the above embodiment, the eye image acquisition module 320 includes:

a canthus distance calculation unit configured for acquiring coordinates of two canthi of each eye from the facial landmarks, and calculating a distance between the two canthi of each eye according to the coordinates of the two canthi;

an affine transformation matrix calculation unit configured for calculating an affine transformation matrix corresponding to each eye according to the distance between the two canthi of each eye and coordinates of a center point of each eye; and an eye image acquisition unit configured for acquiring the left eye image and the right eye image according to the environment image and the affine transformation matrix corresponding to each eye.

On the basis of the above embodiment, the sight classification result acquisition module 330 includes:

a sight classification result acquisition unit configured for inputting the left eye image and the right eye image into a sight classification model respectively, to obtain the left eye sight classification result and the right eye sight classification result to be output by the sight classification model, wherein the left eye sight classification result and the right eye sight classification result each include: looking up, looking down, looking left, looking right, looking forward, and closing an eye.

On the basis of the above embodiment, the device wake-up module 340 includes:

a sight judging unit configured for determining that the user is looking at the target device in a case that the left eye sight classification result and the right eye sight classification result are both looking forward.

On the basis of the above embodiment, the eye image acquisition module 320 includes:

a user identity verification unit configured for performing identity verification on the user according to the plurality of facial landmarks; and a valid user judging unit configured for acquiring the left eye image and the right eye image according to the facial landmarks in a case of determining that the user is a pre-registered valid user for wake-up.

On the basis of the above embodiment, the target device is an intelligent speaker; and the face region recognition module 310 includes:

an environment image acquisition unit configured for acquiring the environment image of the surrounding environment of the target device in real time via at least one camera provided on the intelligent speaker.

The apparatus for waking up a device provided by this embodiment of the present application can perform the method for waking up a device provided by any embodiment of the present application, and therefore has corresponding functional modules and beneficial effects for performing the method.

An electronic device and a readable storage medium are provided according to embodiments of the present application.

Figure 4:
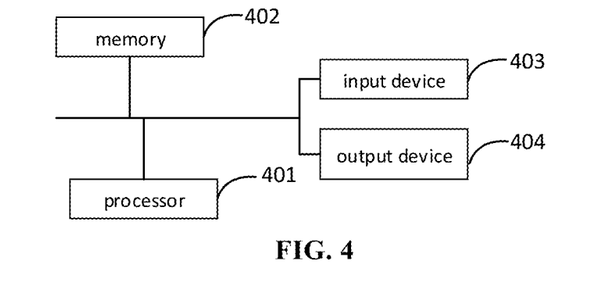
FIG. 4 shows a structural schematic diagram of an electronic device according to an embodiment of the present application.

FIG. 4 shows a block diagram of an electronic device for implementing a method for waking up a device according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular telephones, smart phones, wearable devices, and other similar computing devices. The components shown herein, their connections and relationships, and their functions are by way of example only and are not intended to limit the implementations of the application described and/or claimed herein.

As shown in FIG. 4, the electronic device includes: one or more processors 401, a memory 402, and interfaces for connecting components, including high-speed interfaces and low-speed interfaces. The components are interconnected using different buses and may be mounted on a common motherboard or otherwise as desired. The processor may process instructions for execution within the electronic device, including instructions stored in the memory or on the memory to display graphical information of the GUI on an external input/output device, such as a display device coupled to the interface. In other embodiments, multiple processors and/or multiple buses may be used with multiple memories and multiple storages, if desired. Also, multiple electronic device may be connected, each providing some of the necessary operations (e.g., as an array of servers, a set of blade servers, or a multiprocessor system). An example of one processor 401 is shown in FIG. 4.

The memory 402 is a non-transitory computer-readable storage medium provided in the present application. The memory stores instructions executable by at least one processor to cause the at least one processor to perform the method for waking up a device provided herein. The non-transitory computer-readable storage medium of the present application stores computer instructions for causing a computer to perform the method for waking up a device provided herein.

The memory 402, as a non-transitory computer-readable storage medium, may be used to store non-transitory software programs, non-transitory computer-executable programs, and modules, such as program instructions/modules corresponding to the method for waking up a device in the embodiments of the present application (e.g., the face region recognition module 310, the eye image acquisition module 320, the sight classification result acquisition module 330, and the device wake-up module 340 shown in FIG. 3). The processor 401 executes various functional applications of the server and data processing, i.e., implementing the method for waking up a device in the method embodiments described above, by running the non-transitory software programs, instructions, and modules stored in the memory 402.

The memory 402 can include a program storage area and a data storage area, wherein the program storage area can store application programs required by an operating system and at least one function; the data storage area can store data created according to the use of the electronic device for waking up a device, etc. Additionally, the memory 402 may include a high speed random access memory, and may also include non-transitory memory, such as at least one magnetic disk storage device, flash memory device, or other non-transitory solid state memory device. In some embodiments, the memory 402 alternatively includes memories remotely located with respect to the processor 401, and the remote memories may be connected to the electronic device for waking up a device via a network. Examples of the network include, but are not limited to, the Internet, intranets, local area networks, mobile communication networks, and combinations thereof.

The electronic device for the method for waking up a device may further include: an input device 403 and an output device 404. The processor 401, the memory 402, the input device 403, and the output device 404 may be connected via a bus or otherwise connected, as illustrated in FIG. 4 taking bus connection as an example.

The input device 403 may receive inputted numeric or character information and generate key signal inputs related to user settings and functional controls of the electronic device for waking up a device, for example, the input device may include a touch screen, a keypad, a mouse, a track pad, a touch pad, a pointing stick, one or more mouse buttons, a trackball, a joystick and other input devices. The output device 404 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, ASICs (application-specific integrated circuits), computer hardware, firmware, software, and/or combinations thereof. These various embodiments may include implementation in one or more computer programs that may be executed and/or interpreted on a programmable system including at least one programmable processor, which may be a dedicated or general purpose programmable processor, that can receive data and instructions from a storage system, at least one input device, and at least one output device, and transmit data and instructions to the storage system, the at least one input device, and the at least one output device.

These computing programs (also referred to as programs, software, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the systems and techniques described herein may be implemented on a computer having: a display device (e.g., a CRT (cathode ray tube) or LCD (liquid crystal display) monitor) for displaying information to a user; and a keyboard and a pointing device (e.g., a mouse or a trackball) through which a user can provide input to the computer. Other types of devices may also be used to provide interaction with a user; for example, the feedback provided to the user may be any form of sensory feedback (e.g., visual feedback, auditory feedback, or tactile feedback); and input from the user may be received in any form (including acoustic input, voice input, or tactile input).

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background components, middleware components, or front-end components. The components of the system may be interconnected by any form or medium of digital data communication (e.g., a communication network). Examples of communication networks include: Local Area Networks (LANs), Wide Area Networks (WANs), and the Internet.

The computer system may include a client and a server. The client and server are typically remote from each other and typically interact through a communication network. The relationship of the client and the server is generated by computer programs running on respective computers and having a client-server relationship with each other. The server can be a cloud server, also called a cloud computing server or a cloud host, is a host product in a cloud computing service system, and solves the defects of high management difficulty and weak business expansibility in the traditional physical host and VPS service.

It will be appreciated that the various forms of flows described above may be used, and the steps may be reordered, added or deleted. For example, the steps recited in the present application may be performed in parallel or sequentially or may be performed in a different order, so long as the desired results of the technical solutions disclosed in the present application can be achieved, and no limitation is made herein.

The above-described embodiments are not to be construed as limiting the scope of the present application. It will be apparent to those skilled in the art that various modifications, combinations, sub-combinations and substitutions are possible, depending on design requirements and other factors. Any modifications, equivalents, and improvements within the spirit and principles of this application are intended to be included within the scope of this application.

What is claimed is:

1. A method for waking up a device, comprising:
   acquiring an environment image of a surrounding environment of a target device in real time, and recognizing a face region of a user in the environment image;
   acquiring a plurality of facial landmarks in the face region, and acquiring a left eye image and a right eye image according to the facial landmarks;
   acquiring a left eye sight classification result and a right eye sight classification result according to the left eye image and the right eye image; and
   waking up the target device in a case of determining that the user is looking at the target device according to the left eye sight classification result and the right eye sight classification result,
   wherein the recognizing the face region of the user in the environment image, comprises:
   inputting the environment image into a face bounding box detection model, to obtain coordinates of a plurality of face bounding boxes to be output by the face bounding box detection model; and
   determining a face region in the environment image according to the coordinates of the face bounding boxes.

2. The method according to claim 1, wherein
   the acquiring the plurality of facial landmarks in the face region, comprises:
   inputting the environment image annotated with the face region into a facial landmark detection model, to obtain the plurality of facial landmarks to be output by the facial landmark detection model.

3. The method according to claim 2, wherein the acquiring the left eye image and the right eye image according to the facial landmarks, comprises:
   acquiring coordinates of two canthi of each eye from the facial landmarks, and calculating a distance between the two canthi of each eye according to the coordinates of the two canthi;
   calculating an affine transformation matrix corresponding to each eye according to the distance between the two canthi of each eye and coordinates of a center point of each eye; and
   acquiring the left eye image and the right eye image according to the environment image and the affine transformation matrix corresponding to each eye.

4. The method according to claim 1, wherein the acquiring the left eye sight classification result and the right eye sight classification result according to the left eye image and the right eye image, comprises:
   inputting the left eye image and the right eye image into a sight classification model respectively, to obtain the left eye sight classification result and the right eye sight classification result to be output by the sight classification model,
   wherein the left eye sight classification result and the right eye sight classification result each comprise: looking up, looking down, looking left, looking right, looking forward, and closing an eye.

5. The method according to claim 4, wherein the determining that the user is looking at the target device according to the left eye sight classification result and the right eye sight classification result, comprises:
   determining that the user is looking at the target device in a case that the left eye sight classification result and the right eye sight classification result are both looking forward.

6. The method according to claim 1, wherein the acquiring the plurality of facial landmarks in the face region, and acquiring the left eye image and the right eye image according to the facial landmarks, comprises:
   performing identity verification on the user according to the plurality of facial landmarks; and
   acquiring the left eye image and the right eye image according to the facial landmarks in a case of determining that the user is a pre-registered valid user for wake-up.

7. The method according to claim 1, wherein the target device is an intelligent speaker;
   the acquiring the environment image of the surrounding environment of the target device in real time, comprises:
   acquiring the environment image of the surrounding environment of the target device in real time via at least one camera provided on the intelligent speaker.

8. An apparatus for waking up a device, comprising:
   at least one processor; and
   a memory communicatively connected with the at least one processor, wherein
   the memory stores instructions executable by the at least one processor, and the instructions, when executed by the at least one processor, enable the at least one processor to perform operations comprising:
   acquiring an environment image of a surrounding environment of a target device in real time, and recognizing a face region of a user in the environment image;
   acquiring a plurality of facial landmarks in the face region, and acquiring a left eye image and a right eye image according to the facial landmarks;
   acquiring a left eye sight classification result and a right eye sight classification result according to the left eye image and the right eye image; and
   waking up the target device in a case of determining that the user is looking at the target device according to the left eye sight classification result and the right eye sight classification result,
   wherein the recognizing the face region of the user in the environment image, comprises:
   inputting the environment image into a face bounding box detection model, to obtain coordinates of a plurality of face bounding boxes to be output by the face bounding box detection model; and
   determining a face region in the environment image according to the coordinates of the face bounding boxes.

9. The apparatus according to claim 8, wherein
   the acquiring the plurality of facial landmarks in the face region, comprises:
   inputting the environment image annotated with the face region into a facial landmark detection model, to obtain a plurality of facial landmarks to be output by the facial landmark detection model.

10. The apparatus according to claim 9, wherein the acquiring the left eye image and the right eye image according to the facial landmarks, comprises:
- acquiring coordinates of two canthi of each eye from the facial landmarks, and calculating a distance between the two canthi of each eye according to the coordinates of the two canthi;
- calculating an affine transformation matrix corresponding to each eye according to the distance between the two canthi of each eye and coordinates of a center point of each eye; and
- acquiring the left eye image and the right eye image according to the environment image and the affine transformation matrix corresponding to each eye.

11. The apparatus according to claim 8, wherein the acquiring the left eye sight classification result and the right eye sight classification result according to the left eye image and the right eye image, comprises:
- inputting the left eye image and the right eye image into a sight classification model respectively, to obtain the left eye sight classification result and the right eye sight classification result to be output by the sight classification model,
- wherein the left eye sight classification result and the right eye sight classification result each comprise: looking up, looking down, looking left, looking right, looking forward, and closing an eye.

12. The apparatus according to claim 11, wherein the determining that the user is looking at the target device according to the left eye sight classification result and the right eye sight classification result, comprises:
- determining that the user is looking at the target device in a case that the left eye sight classification result and the right eye sight classification result are both looking forward.

13. The apparatus according to claim 8, wherein the acquiring the plurality of facial landmarks in the face region, and acquiring the left eye image and the right eye image according to the facial landmarks, comprises:
- performing identity verification on the user according to the plurality of facial landmarks; and
- acquiring the left eye image and the right eye image according to the facial landmarks in a case of determining that the user is a pre-registered valid user for wake-up.

14. The apparatus according to claim 8, wherein the target device is an intelligent speaker;
- the acquiring the environment image of the surrounding environment of the target device in real time, comprises:
- acquiring the environment image of the surrounding environment of the target device in real time via at least one camera provided on the intelligent speaker.

15. A non-transitory computer-readable storage medium storing computer instructions, wherein the computer instructions cause a computer to perform operations comprising:
- acquiring an environment image of a surrounding environment of a target device in real time, and recognizing a face region of a user in the environment image;
- acquiring a plurality of facial landmarks in the face region, and acquiring a left eye image and a right eye image according to the facial landmarks;
- acquiring a left eye sight classification result and a right eye sight classification result according to the left eye image and the right eye image; and
- waking up the target device in a case of determining that the user is looking at the target device according to the left eye sight classification result and the right eye sight classification result,
- wherein the recognizing the face region of the user in the environment image, comprises:
- inputting the environment image into a face bounding box detection model, to obtain coordinates of a plurality of face bounding boxes to be output by the face bounding box detection model; and
- determining a face region in the environment image according to the coordinates of the face bounding boxes.

16. The storage medium according to claim 15, wherein the acquiring the plurality of facial landmarks in the face region, comprises:
- inputting the environment image annotated with the face region into a facial landmark detection model, to obtain the plurality of facial landmarks to be output by the facial landmark detection model.

17. The storage medium according to claim 16, wherein the acquiring the left eye image and the right eye image according to the facial landmarks, comprises:
- acquiring coordinates of two canthi of each eye from the facial landmarks, and calculating a distance between the two canthi of each eye according to the coordinates of the two canthi;
- calculating an affine transformation matrix corresponding to each eye according to the distance between the two canthi of each eye and coordinates of a center point of each eye; and
- acquiring the left eye image and the right eye image according to the environment image and the affine transformation matrix corresponding to each eye.

18. The storage medium according to claim 15, wherein the acquiring the left eye sight classification result and the right eye sight classification result according to the left eye image and the right eye image, comprises:
- inputting the left eye image and the right eye image into a sight classification model respectively, to obtain the left eye sight classification result and the right eye sight classification result to be output by the sight classification model,
- wherein the left eye sight classification result and the right eye sight classification result each comprise: looking up, looking down, looking left, looking right, looking forward, and closing an eye.

19. The storage medium according to claim 18, wherein the determining that the user is looking at the target device according to the left eye sight classification result and the right eye sight classification result, comprises:
- determining that the user is looking at the target device in a case that the left eye sight classification result and the right eye sight classification result are both looking forward.

20. The storage medium according to claim 15, wherein the acquiring the plurality of facial landmarks in the face region, and acquiring the left eye image and the right eye image according to the facial landmarks, comprises:
- performing identity verification on the user according to the plurality of facial landmarks; and
- acquiring the left eye image and the right eye image according to the facial landmarks in a case of determining that the user is a pre-registered valid user for wake-up.

* * * * *